US007617242B2

(12) United States Patent  (10) Patent No.: US 7,617,242 B2
Matsuo et al.  (45) Date of Patent: Nov. 10, 2009

(54) METHOD AND APPARATUS FOR REPRODUCING PLAY LISTS IN RECORD MEDIA

(75) Inventors: Keisuke Matsuo, Nara (JP); Hiroshi Kase, Osaka (JP); Kevin Leigh La Chapelle, Redmond, WA (US); Ian Cameron Mercer, Sammammish, WA (US); Brian James Walker, Duvall, WA (US)

(73) Assignee: Panasonic Corporation, Osaka (JP)

( * ) Notice: Subject to any disclaimer, the term of this patent is extended or adjusted under 35 U.S.C. 154(b) by 196 days.

(21) Appl. No.: 11/090,544

(22) Filed: Mar. 25, 2005

(65) Prior Publication Data
US 2005/0232091 A1 Oct. 20, 2005

Related U.S. Application Data

(60) Provisional application No. 60/557,647, filed on Mar. 30, 2004.

(51) Int. Cl.
G06F 7/00 (2006.01)
(52) U.S. Cl. .................................. 707/104.1
(58) Field of Classification Search .............. 707/104.1, 707/100, 1, 101, 102; 369/30.07–30.09; 386/95, 125, 126
See application file for complete search history.

(56) References Cited

U.S. PATENT DOCUMENTS 6,006,234 A 12/1999 Govindarajan et al.
6,215,746 B1 4/2001 Ando et al.
6,282,365 B1 8/2001 Gotoh et al.
6,285,826 B1 9/2001 Murase et al.
6,292,625 B1 9/2001 Gotoh et al.
6,314,235 B1 11/2001 Gotoh et al.
6,351,442 B1* 2/2002 Tagawa et al. ........... 369/53.41
6,400,893 B1 6/2002 Murase et al.
6,408,301 B1 6/2002 Patton et al.

(Continued)

FOREIGN PATENT DOCUMENTS

EP 0 926 680 6/1999

(Continued)

OTHER PUBLICATIONS

"Aliases to Local and Remote Records", Research Disclosure, Kenneth Mason Publications, XP-000748562, p. 409, Aug. 1985.

(Continued)

*Primary Examiner*—Tan X Dinh
(74) *Attorney, Agent, or Firm*—RatnerPrestia

(57) ABSTRACT

A recording and reproducing system includes a DVD-RAM medium having a plurality of data files of storing predetermined data, file recording means of recording, in a play list file held by the DVD-RAM medium, a play list of describing reproduction order of reproducing the predetermined data stored in each of all or a part of the data files out of the plurality of data files by using a file name of the data file and a unique directory ID provided to a directory to which the data file belongs, and file reproducing means of reproducing the predetermined data stored by each of all or a part of the data files out of the plurality of data files based on the recorded play list.

11 Claims, 7 Drawing Sheets

U.S. PATENT DOCUMENTS

| | | | |
|---|---|---|---|
| 6,424,797 | B1 | 7/2002 | Murase et al. |
| 6,442,333 | B1 | 8/2002 | Izawa |
| 6,542,445 | B2 * | 4/2003 | Ijichi et al. ............... 369/30.08 |
| 6,574,420 | B1 | 6/2003 | Gotoh et al. |
| 6,614,732 | B2 * | 9/2003 | Nonaka et al. ........... 369/30.18 |
| 6,665,690 | B2 | 12/2003 | Kimura et al. |
| 6,941,324 | B2 * | 9/2005 | Plastina et al. ........... 707/104.1 |
| 7,043,477 | B2 * | 5/2006 | Mercer et al. .................. 707/7 |
| 7,054,888 | B2 * | 5/2006 | LaChapelle et al. ...... 707/104.1 |
| 7,096,234 | B2 * | 8/2006 | Plastina et al. ........... 707/104.1 |
| 7,136,874 | B2 * | 11/2006 | Mercer et al. ............ 707/104.1 |
| 7,159,000 | B2 * | 1/2007 | Plastina et al. ................ 707/10 |
| 2001/0026504 | A1 | 10/2001 | Nonaka et al. |
| 2002/0034130 | A1 | 3/2002 | Tagawa et al. |
| 2002/0049731 | A1 | 4/2002 | Kotani |
| 2002/0164152 | A1 | 11/2002 | Kato et al. |
| 2003/0012549 | A1 | 1/2003 | Ohnuma |
| 2003/0103604 | A1 | 6/2003 | Kato et al. |
| 2003/0174593 | A1 | 9/2003 | Tagawa et al. |
| 2003/0194216 | A1 | 10/2003 | Gotoh et al. |
| 2003/0194217 | A1 | 10/2003 | Gotoh et al. |
| 2003/0194218 | A1 | 10/2003 | Gotoh et al. |
| 2003/0206721 | A1 | 11/2003 | Gotoh et al. |
| 2003/0226019 | A1 * | 12/2003 | Nonaka et al. ............... 713/168 |
| 2004/0078357 | A1 * | 4/2004 | LaChapelle et al. ............. 707/2 |
| 2004/0078382 | A1 * | 4/2004 | Mercer et al. ............... 707/102 |
| 2004/0078383 | A1 * | 4/2004 | Mercer et al. ............... 707/102 |
| 2004/0215873 | A1 * | 10/2004 | Matsumi et al. ............. 711/112 |
| 2005/0055375 | A1 * | 3/2005 | Torii et al. ............... 707/104.1 |
| 2005/0111820 | A1 * | 5/2005 | Matsumi et al. ............... 386/46 |
| 2005/0111831 | A1 * | 5/2005 | Matsumi et al. ............... 386/95 |
| 2005/0232091 | A1 * | 10/2005 | Matsuo et al. ........... 369/30.08 |
| 2005/0234858 | A1 * | 10/2005 | Torii et al. ..................... 707/1 |
| 2006/0020609 | A1 * | 1/2006 | LaChapelle et al. ......... 707/100 |

FOREIGN PATENT DOCUMENTS

| | | |
|---|---|---|
| EP | 0 949 622 | 10/1999 |
| EP | 0 957 487 | 11/1999 |
| EP | 0 962 929 | 12/1999 |
| EP | 1 115 118 | 7/2001 |
| EP | 1 150 297 | 10/2001 |
| EP | 1 198 132 | 4/2002 |
| EP | 1 248 259 | 10/2002 |
| EP | 1 411 520 | 4/2004 |
| JP | 11-120052 A | 4/1999 |
| JP | 11 297006 | 10/1999 |
| JP | 11-317025 | 11/1999 |
| JP | 2000-235780 A | 8/2000 |
| JP | 3098237 | 8/2000 |
| JP | 3297333 | 4/2002 |
| JP | 2002-313070 | 10/2002 |
| JP | 2004-013276 A | 1/2004 |
| JP | 2004-152359 | 5/2004 |
| WO | WO 01/28222 | 4/2001 |
| WO | WO 02/41319 | 5/2002 |
| WO | WO 03/023781 | 3/2003 |
| WO | WO 03/054870 A3 | 7/2003 |
| WO | WO 2004/008460 | 1/2004 |
| WO | WO 2004/027774 A1 | 4/2004 |

OTHER PUBLICATIONS

Apple Computer, Inc., "Audio Interchange File Format version 1.3 AIFF", Jan. 4, 1989, XP0002274283, pp. 1-26.

* cited by examiner

METHOD AND APPARATUS FOR REPRODUCING PLAY LISTS IN RECORD MEDIA

RELATED APPLICATIONS

This application claims priority of U.S. Provisional Application Ser. No. 60/557,647, filed on Mar. 30, 2004.

BACKGROUND OF THE INVENTION

1. Field of the Invention

The present invention relates to a recording and reproducing system, a recording apparatus, a reproducing apparatus, a recording medium, a recording and reproducing method, a recording method, a reproducing method, a program and a recording medium.

2. Related Art of the Invention

To begin with, a description will be given as to configuration and operation of a personal computer for reproducing data files such as an image file having image data and a voice file having voice data (refer to Patent Document 1, Japanese Patent Laid-Open No. 2000-235780 for instance).

The data files such as the image file and voice file are recorded on a recording medium such as a CD-ROM (Compact Disk-Read Only Memory) according to a predetermined file system.

The personal computer performs play list reproduction wherein it interprets a play list file in an HTML (Hypertext Markup Language) format describing reproduction order of the data files by using file names of the data files to consecutively reproduce a plurality of data files.

In the play list file in the HTML format, the data file to be reproduced is described by using the file name including a path name. And the data file is generally recorded on the recording medium via a file system by associating the file name with substantial data in the file. For instance, in the case of the CD-ROM, the file system in compliance with the ISO 9660 standard is used.

Therefore, to reproduce a reproduction file described in the play list file, a reproducing apparatus of reproducing the play list file requires the following procedure. That is, it first obtains a data file name described in the play list file, and then reads and analyzes information of the file system from the recording medium. And it identifies a record location of the data file to be reproduced, and then reads the data recorded at the record location so as to perform reproduction. To be more specific, in order to start the reproduction of the data file, it is necessary to search for and obtain the information on the record location based on the information of the file system.

Here, there is a problem that, if a large amount of data files are on the recording medium, it takes time to search for and obtain the information on the record location of the data file from the file system, causing a delay in a reproduction start time. Hereafter, this problem will be described in detail.

The information of the file system is generally managed in directories. For this reason, in the case where the data files are recorded in a hierarchy by using the directories, it is necessary, when obtaining the information on the record location of the data file, to trace the information of the file system for each directory downward from a root directory. Consequently, in a data structure in which the data file is located in a hierarchy deep from the root directory in particular, it is not possible to obtain the information on the actual record location of the data file without reading and analyzing the information of the file system for many directories.

The process of reading and analyzing the data of the file system has required certain processing time on a reproducing device, leading to the delay of the reproduction start time. And the data of the file system is not always consecutively recorded. Therefore, a head needs to seek in some cases in order to read the data of the file system from the recording medium when obtaining the information of the file system hierarchically for each directory. The time required for the seek is also a factor behind the delay of the reproduction start time.

Consequently, for a commercial-off-the-shelf device such as a DVD player, data readout speed from the recording medium is not high compared to the personal computer, and data processing speed of a built-in microcomputer is not high either. Therefore, in particular, the processing time in conjunction with the aforementioned data readout and analysis of the file system causes the delay of the reproduction time, and it is not possible to provide a play list reproduction function of good responsiveness.

It is generally thinkable, as regards such a problem, to speed it up by caching the data of the file system in an internal work memory. In the case where the data of the file system is cached in the internal memory by such a method, it is no longer necessary to read the data of the file system from the recording medium so that no delay arises in conjunction with data readout and the data of the file system can be analyzed at high speed by searching the data on the internal memory.

To cache and manage the data of the file system managed by the directory in the internal memory, however, it is necessary to cache it correspondingly to a directory name. And when searching for the data in the cache, it is necessary to search for the data of the file system corresponding to a desired directory by using the directory name as a key.

In this case, as the data of the file system is stored correspondingly to the directory name, there is a problem that a data capacity to be cached increases if the directory name is a long character string. When searching for the data in the cache, it is necessary to make a search by using the character string of the directory name as the key. Therefore, it requires a comparison process equivalent to the number of characters to ensure a match with the character string so that the search takes certain processing time. In the case where a directory tree is deep, it is necessary, as in the case of using no internal cache, to repeatedly search for the information of the file system for each directory in sequence from the root directory downward. This search process also takes certain processing time.

Consequently, for the commercial-off-the-shelf device such as the DVD player incapable of analyzing the data of the file system at high speed even when using the internal cache, there is a problem that it is not possible to provide the play list reproduction function of good responsiveness in the play list reproduction with the file name described.

SUMMARY OF THE INVENTION

In consideration of the problems in the past, an object of the present invention is to provide a recording and reproducing system, a recording apparatus, a reproducing apparatus, a recording medium, a recording and reproducing method, a program and a recording medium capable of performing play list reproduction by curbing a delay of reproduction time due to a file system search at a data processing level of a DVD player not having a high data readout speed from the recording medium and incapable of analyzing the data of the file system at high speed.

DESCRIPTION OF SYMBOLS

Figure 1:
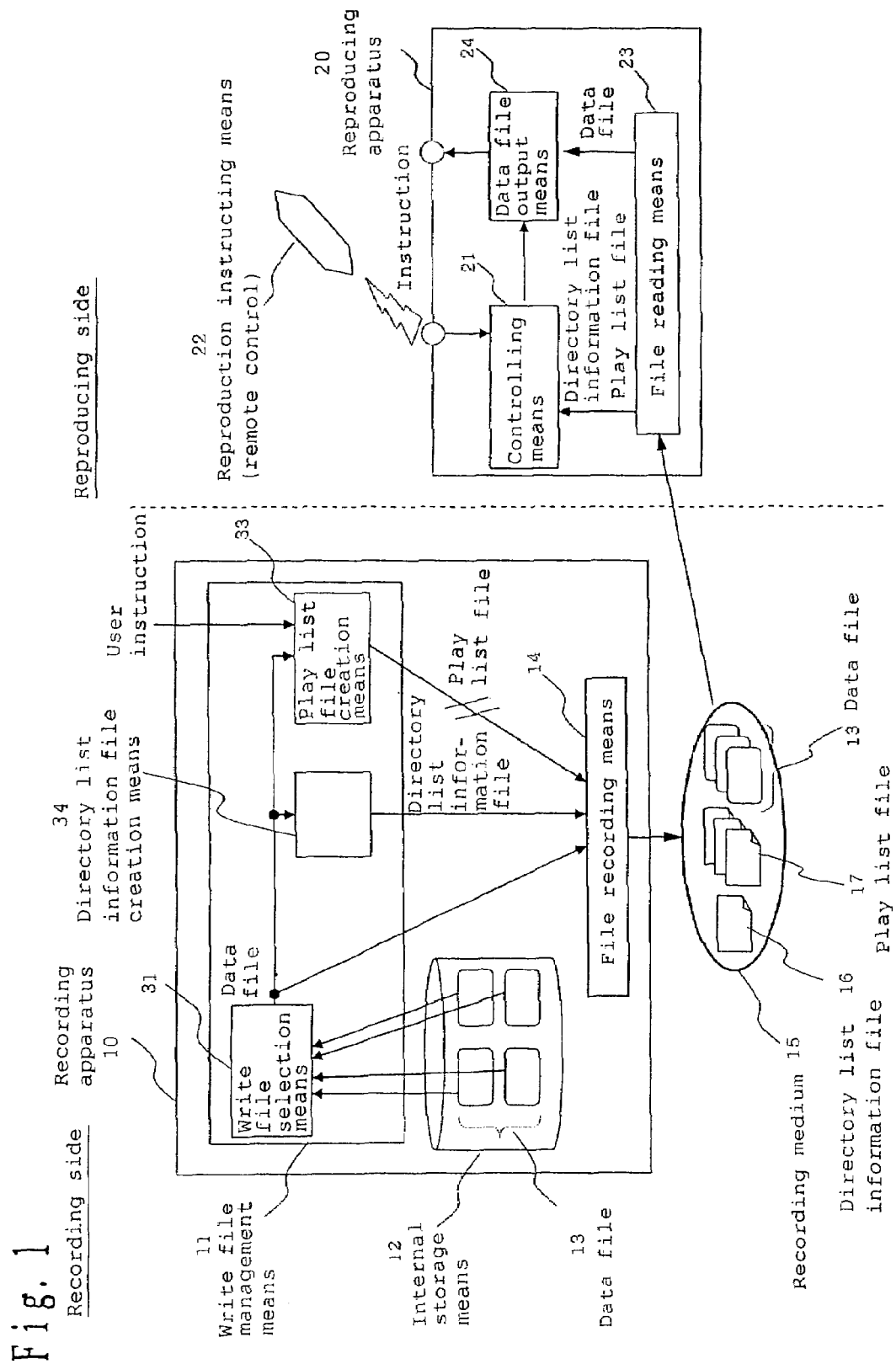
FIG. 1 is a block diagram of a recording and reproducing system according to a first embodiment of the present invention.

10 Recording apparatus
11 Write file management means
12 Internal storage means
13 Data file group
14 File recording means
15 Recording medium
16 Directory list information file
17 Play list file
20 Reproducing apparatus
21 Controlling means
22 Reproduction instructing means (remote control)
23 File reading means
24 Data file output means
31 Write file selection means
33 Play list file creation means
34 Directory list information file creation means

PREFERRED EMBODIMENTS OF THE INVENTION

Hereafter, embodiments of the present invention will be described by referring to the drawings.

First Embodiment

First, configuration of a recording and reproducing system according to a first embodiment of the present invention will be described by mainly referring to FIG. 1 which is a block diagram thereof.

A recording apparatus 10 comprises (1) write file management means 11 having write file selection means 31, information extraction means 32, play list file creation means 33 and directory list information file creation means 34, (2) internal storage means 12 of storing a data file group 13, and (3) file recording means 14 of performing recording on a DVD-RAM medium 15 of storing the data file group 13, a directory list information file 16 and a play list file 17.

To be more precise, the write file management means 11 has a CPU (Central Processing Unit) and so on. The internal storage means 12 has an HD (Hard Disk) and so on. The file recording means 14 has a DVD-RAM drive and so on.

The directory list information file 16 and the play list file 17 will be described in detail later.

A reproducing apparatus 20 comprises (1) controlling means 21 of inputting an instruction to be performed by reproduction instructing means (remote control) 22 and exerting control, (2) file reading means 23 of performing reproduction from the DVD-RAM medium 15, and (3) data file output means 24.

To be more precise, the controlling means 21 has a CPU and so on. The file reading means 23 has a DVD-RAM drive and so on. The data file output means 24 has a decoder and so on.

Here, the directory list information file 16 and the play list file 17 will be described in detail.

(A) the directory list information file 16 will be described first, and (B) the play list file 17 will be described next.

(A) The directory list information file 16 has information on a directory to which the data files of the data file group 13 belong stored therein. A unique directory ID is assigned to each directory.

Here, the directory list information file 16 will be described further in detail by referring to FIG. 2 which is an explanatory diagram of the data storage format of the directory list information file 16 according to the first embodiment of the present invention. Here, a description will be given on the assumption that there are n pieces of directory #1, . . . , #n to which the data files of the data file group 13 belong.

The directory list information file 16 is comprised of a header portion 40 and a directory table portion 41.

The header portion 40 is comprised of at least a directory number storing portion 44 and a next assignment directory ID information 45.

The directory number storing portion 44 stores the number of pieces of directory entry information stored in a directory information storing portion 42 described later. The next assignment directory ID information 45 has a value of a directory ID to be used on a next directory ID assignment stored therein.

The directory table portion 41 is comprised of the directory information storing portion 42 and a directory name storing portion 43.

The directory information storing portion 42 has the directory entry information #1, . . . , #n corresponding to the directories #1, . . . , #n respectively stored therein. The directory entry information #k has reference information to the directory entry information corresponding to a parent directory, the reference information to a directory name of the directory #k and the unique directory ID assigned to the directory #k stored therein.

The directory name storing portion 43 has directory name information #1, . . . , #n corresponding to the directories #1, . . . , #n respectively stored therein. The directory name information #k has character data representing the directory name length and the directory name of the directory #k stored therein which is associated with the directory entry information #k so as to be referred to therefrom.

In this case, the aforementioned directory number storing portion 44 has the directory entry information #1, . . . , #n stored in the directory information storing portion 42, and so n corresponding to the number thereof is stored therein.

(B) The play list file 17 has the play lists relating to all or a part of the data files of the data file group 13 selected by the write file selection means 31 stored therein.

The play list file 17 is a list of describing reproduction order of the data files specified by a user by a GUI (Graphical User Interface) input by using the file names. As a matter of course, the same data file may appear more than once in the play list file 17.

Here, the play list file 17 will be described more concretely by referring to FIG. 3 which is an explanatory diagram of the data storage format of the play list file 17 according to the first embodiment of the present invention.

The play list file 17 is comprised of at least a reproduction file describing portion 51.

The reproduction file describing portion 51 is comprised of a reproduction file information storing portion 52 and a file name storing portion 53.

The reproduction file information storing portion 52 has the number of selected reproduction data files and content entry information #1, . . . , #n corresponding to the selected reproduction data files #1, . . . , #n respectively stored therein. Storage order of the content entry information is corresponding to the specified reproduction order. The content entry information #k has at least the reference information to a file name of the reproduction data file #k and the unique directory ID assigned to the directory to which the reproduction data file #k belongs stored therein. Here, as previously mentioned, the directory ID is the ID managed by being uniquely associated with the directory in the directory list information file 16.

The file name storing portion 53 has file name information #1, . . . , #n corresponding to the reproduction data files #1, . . . , #n respectively stored therein. To be more precise, the file name information #k has the character data representing the file name length and the file name of the reproduction data file #k stored therein which is associated with the content entry information #k so as to be referred to therefrom.

The configuration of the recording and reproducing system according to this embodiment was described in detail above.

Next, operation of the recording and reproducing system according to this embodiment will be described.

An embodiment of a recording and reproducing method, a recording method and a reproducing method of the present invention will also be described while describing the operation of the recording and reproducing system according to this embodiment.

<1> To begin with, a description will be given as to the operation of the recording apparatus 10 for the sake of recording the data files #1, . . . , #n of the data file group 13 and the play list file 17 on the DVD-RAM medium 15.

In compliance with an instruction provided by the user to the effect of "creating the play list file 17 and recording the data file of the data file group 13 and the created play list file 17 on the DVD-RAM medium 15," the write file selection means 31 selects the data file of the data file group 13 to be recorded on the DVD-RAM medium 15 out of the data files of the data file group 13 stored in the internal storage means 12.

The directory list information file creation means 34 analyzes the information on the directory to which the data files #1, . . . , #n belong, and creates the directory list information file 16. This operation will be described more concretely by referring to FIG. 4 which are explanatory diagrams of a directory ID assigning method according to an embodiment of the present invention.

Figure 4:
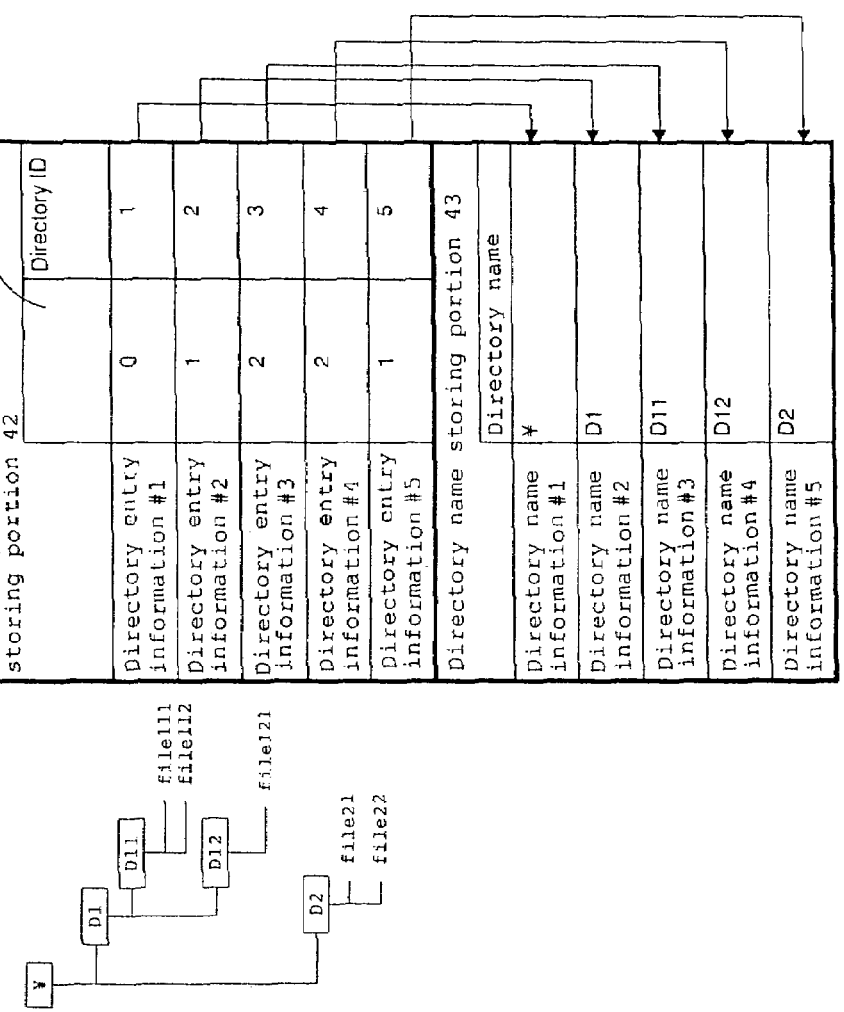
FIG. 4(a) is an explanatory diagram (1) of a directory ID assigning method according to the first embodiment of the present invention.
FIG. 4(b) is an explanatory diagram (2) of the directory ID assigning method according to the first embodiment of the present invention.
FIG. 4(c) is an explanatory diagram (3) of the directory ID assigning method according to the first embodiment of the present invention.

FIG. 4(*a*) shows a data configuration of the data file to be recorded on the recording medium 15. There are five data files to be recorded, and their file names are "file11," "file112," "file121," "file21" and "file22." In FIG. 4(*a*), ¥, "D1," "D11," "D12" and "D2" represent the directory names. If described in a format including path names from the root directory, the aforementioned five data files to be recorded are represented as "¥D1¥D11¥file111," "¥D1¥D11¥file112," "¥D1¥D12¥file21," "¥D2¥file21" and "¥D2¥file22."

FIG. 4(*b*) shows a result of storing the information on the five directories "¥," "D1," "D11," "D12" and "D2" shown in FIG. 4(*a*) in the directory table portion 41 of the directory list information file 16. The method of creating it will be described in detail below.

First, the information on the root directory is stored in the directory entry information #1 of the directory information storing portion 42, and a directory ID=1 is provided. The directory entry information number of the parent directory is set at 0, which indicates that it is the root directory. On the other hand, "¥" as the directory name of the root directory is stored in the directory name information #1 of the directory name storing portion 43 so as to be referred to from the directory entry information #1.

Next, the information on the directory "D1" is stored in the directory entry information #2, and a directory ID=2 is provided. The directory entry information number of the parent directory is set at 1, which indicates that the root directory stored in the directory entry information #1 is the parent directory. The directory IDs have the numbers in ascending order assigned thereto so as not to overlap the directory IDs already assigned. On the other hand, "D1" as the directory name is stored in the directory name information #2 of the directory name storing portion 43 so as to be referred to from the directory entry information #2. Thereafter, as to the directories "D11," "D12" and "D2, a reference relationship of the directory entry information number of the parent directory, the directory ID and directory name are stored in order by the same method. In FIG. 4(*b*), directory IDs=3, 4 and 5 are uniquely associated with the directories "D11," "D12" and "D2" respectively. At this point in time, a value 5 as the information indicating the number of directories is stored in the directory number storing portion 44 of the header portion 40 of the directory list information file 16. Likewise, a value 6 is stored, for instance, in the next assignment directory ID information storing portion 45 of the header portion 40. The next assignment directory ID information storing portion 45 should have the value set so as not to overlap the directory ID already assigned. For instance, the value wherein 1 is added to a maximum value of the directory ID already assigned should be set.

A description was given above by referring to FIG. 4 as to the operation of the directory list information file creation means 34.

The play list file creation means 33 creates the play list file 17 relating to the data file of the data file group 13 selected by the write file selection means 31 according to the instruction of the user by the GUI input.

As previously described, the reproduction order of the data files specified by the user is described by using the filenames. Each data file is described by adding the directory ID given to the directory to which it belongs. This will be described more concretely by referring to FIG. 4(*c*). Here, a description will be given on the assumption that, of the data files to be recorded shown in FIG. 4(*a*), the "file111" and "file22" are selected and are stored in the play list file 17 in this reproduction order.

The file name storing portion 53 has the file name of the data file "file111" stored in the file name information #1 and the file name of the data file "file22" stored in the file name information #2 respectively.

The reproduction file information storing portion 52 has a value 2 as the information indicating the number of selected reproduction data files stored therein, and also has the content entry information #1 and #2 stored therein.

The content entry information #1 has the reference information to the file name information #1 of the file name storing portion 53 and the directory ID=3 provided to the directory "D11" to which the data file belongs stored therein. The content entry information #2 has the reference information to the file name information #2 of the file name storing portion 53 and the directory ID=6 provided to the directory "D2" to which the data file belongs stored therein. Here, the directories are associated with the directory IDs as shown in FIG. 4(*b*).

The operation of the play list file creation means 33 was concretely described above by referring to FIG. 4.

The file recording means 14 records the data file of the data file group 13 selected by the write file selection means 31 on the DVD-RAM medium 15, and also records the directory list information file 16 created by the directory list information file creation means 34 and the play list file 17 created by the play list file creation means 33 on the DVD-RAM medium 15.

As a matter of course, the directory list information file 16 thus recorded on the DVD-RAM medium 15 may be updated by additionally overwriting it with the directory information on another data file. In the case of appending the directory information, the value stored in the next assignment directory ID information 45 is assigned to the directory to which it is newly appended to, and then the value of the next assignment directory ID information 45 is updated.

The play list file 17 thus created on the DVD-RAM medium 15 may have the reproduction order additionally overwritten with another data file or may have the reproduction order overwritten according to the instruction of the user and so on.

<2> Next, a description will be given as to the operation of the reproducing apparatus 20 for the sake of reproducing the data file recorded on the DVD-RAM medium 15 by using the play list file 17.

In compliance with the instruction provided by the user to the effect of "reproducing the file recorded on the DVD-RAM medium 15 by using the play list file 17," the reproduction instructing means 22 provides the instruction to the same effect to the controlling means 21.

In compliance with the instruction provided by the reproduction instructing means 22, the controlling means 21 provides the same instruction to the file reading means 23.

In compliance with the instruction provided by the controlling means 21, the file reading means 23 reads the contents of the directory list information file 16 recorded on the DVD-RAM medium 15. It reads the data of a file system corresponding to the directory corresponding to the directory entry information #1, . . . , #n stored in the directory list information file 16 so as to cache it correspondingly to the directory ID in an internal work memory (not shown). The data of the file system has the information on a record location on the recording medium of the directory and the file stored in the directory stored therein. To access the directory or file in a lower layer, it is necessary to obtain the information on the record location in advance.

Figure 5:
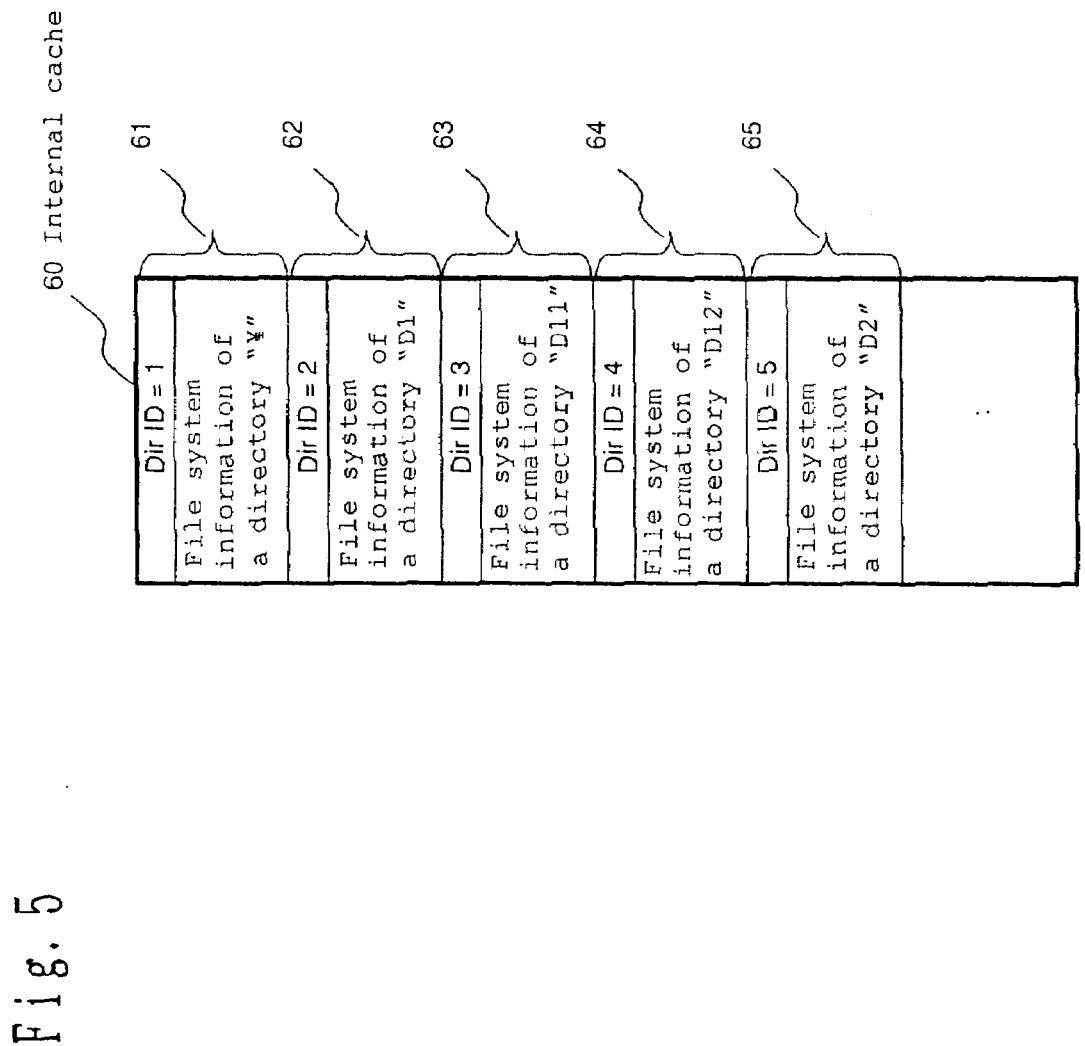
FIG. 5 is an explanatory diagram of an example of the data storage format of an internal cache of a reproducing apparatus according to an embodiment of the present invention.

FIG. 5 is an explanatory diagram of an example of the data storage format of an internal cache of the reproducing apparatus according to an embodiment of the present invention. Hereafter, a more concrete description will be given by referring to FIG. 5 as to the operation of the file reading means 23 of caching the data of the file system to the internal work memory.

In the case of recording the data file having a data structure shown in FIG. 4(*a*), for instance, the directory ID is given to each directory and is stored in the directory list information file 16 as shown in FIG. 4(*b*). The controlling means 21 instructs the file reading means 23 to store the information on the file system relating to the root directory to which the directory ID=1 is provided in the internal cache by associating it with the directory ID based on the contents of the directory list information file 16. In compliance with the instruction from the controlling means 21, the file reading means 23 reads the information on the file system relating to the root directory from the recording medium 15, and stores the information in an internal cache 60 by associating it with the directory ID=1 (corresponding to an area 61 in FIG. 5). Next, the controlling means 21 instructs the file reading means 23 to store the information on the file system relating to the directory "D1" to which the directory ID=2 is provided in the internal cache by associating it with the directory ID. In compliance with the instruction from the controlling means 21, the file reading means 23 reads the information on the file system relating to the directory "D1" from the recording medium 15, and stores the information in the internal cache 60 by associating it with the directory ID=2 (corresponding to an area 62 in FIG. 5). Thereafter, in compliance with the instruction from the controlling means 21, the file reading means 23 likewise reads the information on the file system relating to the remaining directories "D1", "D11", "D12" and "D2," and stores the information in the internal cache 60 by associating it with the directory IDs (corresponding to areas 63, 64 and 65 in FIG. 5 respectively).

Next, in compliance with the instruction provided by the controlling means 21, the file reading means 23 reads the contents of the play list file 17 recorded on the DVD-RAM medium 15.

As previously described, the play list file 17 has the reproduction order of the data file specified by the user described by using the file name except the path name and the directory ID corresponding to the directory to which it belongs rather than the file name of a full path including the path name.

The controlling means 21 interprets the contents of the read play list file 17, obtains the information on the directory ID of the directory to which the reproduction file belongs and associates it with the file name so as to instruct the file reading means 23 to reproduce the data file. The operation of the controlling means 21 will be described more concretely as to the case of the play list file 17 shown in FIG. 4(*c*).

The controlling means 21 interprets the contents of the read play list file 17, and first obtains the facts that the file name of the data file located at the head of the reproduction order which is specified is the "file111," and the directory ID=3 is assigned to the directory to which the file belongs. It uniquely specifies the reproduction file by using the information so as to instruct the file reading means 23 to reproduce the corresponding data file.

In compliance with the instruction provided by the controlling means 21, the file reading means 23 searches for the information on the directory by using as the key the directory ID specified by the controlling means 21 from the information on the file system accumulated in the internal cache 60. Next, it searches for the file name of the reproduction file specified by the controlling means 21 from the file system information corresponding to the directory, and obtains the file system information on the record location of the reproduction file. The operation of the file reading means 23 will be described more concretely as to the case where the controlling means 21 instructs it to reproduce the data file of the file name "file111" belonging to the directory of the directory ID=3 and the file system information is stored in the internal cache according to the example shown in FIG. 5. The file reading means searches for the file system information on the directory corresponding to the directory ID from the data in the internal cache 60 shown in FIG. 5 by using the directory ID=3 as the key so as to identify the data in the area 63. Next, it obtains the file system information on the record location of the file corresponding to the file name "file111" from the file system information stored in the area 63.

By means of the above operation, the file reading means 23 obtains the file system information on the record location of the data file which it was instructed to reproduce by the controlling means 21.

The file reading means 23 reads the contents of the data file recorded on the DVD-RAM medium 15 by using the file system information on the record location.

The data file output means 24 outputs the read data file contents by using format conversion from a file format to an image or voice output format.

As a matter of course, reading of the data file contents and output of the read data file contents are performed in the reproduction order of the data files described in the play list file 17.

The operation of the recording and reproducing system according to this embodiment was described in detail above.

Next, the effects of the recording and reproducing system according to this embodiment will be described.

The recording and reproducing system according to this embodiment has data management of the play list file 17 performed by using the file name except the path name and the directory ID of the directory to which it belongs rather than the file name including the path name. As a matter of course, the directory ID is uniquely associated with the directory by using the directory list information file 16.

A 32-bit ID may be used for the directory ID for instance, which is sufficiently smaller than data size of the directory name. More specifically, 32-bit binary positive number, or a word constituted of three or less numerals or alphabets may be used for the directory ID, for example.

For this reason, the recording and reproducing system according to this embodiment renders the size of the play list file 17 small so that a capacity of the DVD-RAM medium 15 can be effectively exploited for the recording of an image file and a voice file which is essential. In the case of caching the data of the file system correspondingly to the directory, the directory ID can be used instead of the directory name so as to reduce a data capacity of the cache.

When obtaining the information on the record location of the data file to be reproduced from the data on the file system cached in the internal memory, it is possible to directly access the information of the file system of the directory to which the data file belongs by using the directory ID instead of sequentially searching the information of the file system in lower layers hierarchically from the root directory. Therefore, it is possible to provide a play list reproduction function of good responsiveness in which the delay of the processing time in conjunction with the search of the data of the file system of the directory is curbed.

The directory list information file 16 has the next assignment directory ID information 45 stored therein. Therefore, in the case of newly adding the directory, it is possible to provide the directory ID only to the newly added directory without changing the assignment of the directory IDs to the existing directories and after assuring uniqueness. To be more specific, in the case of additionally recording a new data file on the recording medium and adding it to the play list file 17, as to the data file already stored in the play list file 17, the directory ID does not need to be changed and only a portion related to the added data file should be added. Therefore, it is possible to implement a convenient recording and reproducing system capable of easily adding the data file.

(1) The play list file of the present invention is the play list file 17 according to the above-mentioned embodiment.

However, it is not limited thereto but, in short, the play list file of the present invention may be the file held by the recording medium for the sake of storing the play list of describing the reproduction order of reproducing predetermined data stored in each of all or a part of the data files out of a plurality of data files by using the file name of the data file and the unique directory ID provided to each directory to which it belongs.

(2) A directory information file of the present invention is the directory list information file 16 according to the above-mentioned embodiment.

However, it is not limited thereto but, in short, the directory information file of the present invention may be the file held by the recording medium for the sake of storing the directory name and the unique ID provided to each directory as to all the directories to which a plurality of data files hierarchically belong.

(3) As for the directory information file of the present invention, it is possible to store directory information by sorting it by a predetermined rule such as hierarchical order of the directories or alphabetical order of the directory names.

If thus arranged, it has the effect, in the case of adding the directory information to the directory information file, of allowing an efficient search as to whether or not that information overlaps the directory information already stored. To describe it more concretely, in the case where the directory information is randomly stored in the directory information file, an identity search must be performed as to all the directory information already stored in order to ensure that the directory information to be added is not stored.

As opposed to this, in the case where it is sorted in alphabetical order for instance, a search should be made by the directory name in order of a dictionary search from the head of the directory information already stored. Therefore, it is usually unnecessary to search all the directory information already stored so that a search time can be reduced. Consequently, it is possible to implement the convenient recording and reproducing system of good responsiveness capable of adding the data files.

(4) The recording medium of the present invention is the DVD-RAM medium 15 according to the above-mentioned embodiment.

However, it is not limited thereto but the recording medium of the present invention may be a removable medium such as a CD-R (Compact Disk-Recordable) medium or a DVD-R (Digital Versatile Disk-Recordable) medium or a built-in storage device such as an HDD (Hard Disk Drive) built into the recording apparatus or the reproducing apparatus.

In short, the recording medium of the present invention has only to be the means of holding a plurality of data files of storing the predetermined data, the play list file of storing the play list of describing the reproduction order of reproducing predetermined data stored in each of all or a part of the data files out of the plurality of data files by using the file name of the data file and the unique directory ID provided to each directory to which the data file belongs and the directory information file of storing the directory name and the unique ID provided to each directory as to all the directories to which the data files hierarchically belong.

(5) The recording medium of the present invention has one play list file 17 according to the above-mentioned embodiment.

However, it is not limited thereto but the recording medium of the present invention may have a plurality of play list files.

As a matter of course, in the case where a plurality of play list files are held, it is specified by the instruction of the user as to the play list file on which the predetermined data will be reproduced.

(6) The play list file of the present invention is created according to the instruction of the user by the GUI input according to the above-mentioned embodiment.

However, it is not limited thereto but the play list file of the present invention may be automatically created according to a predetermined algorithm of reproducing titles of the files in alphabetical order.

(7) The play list file of the present invention may further store the information corresponding to a directory table stored in the directory list information file.

Figure 6:
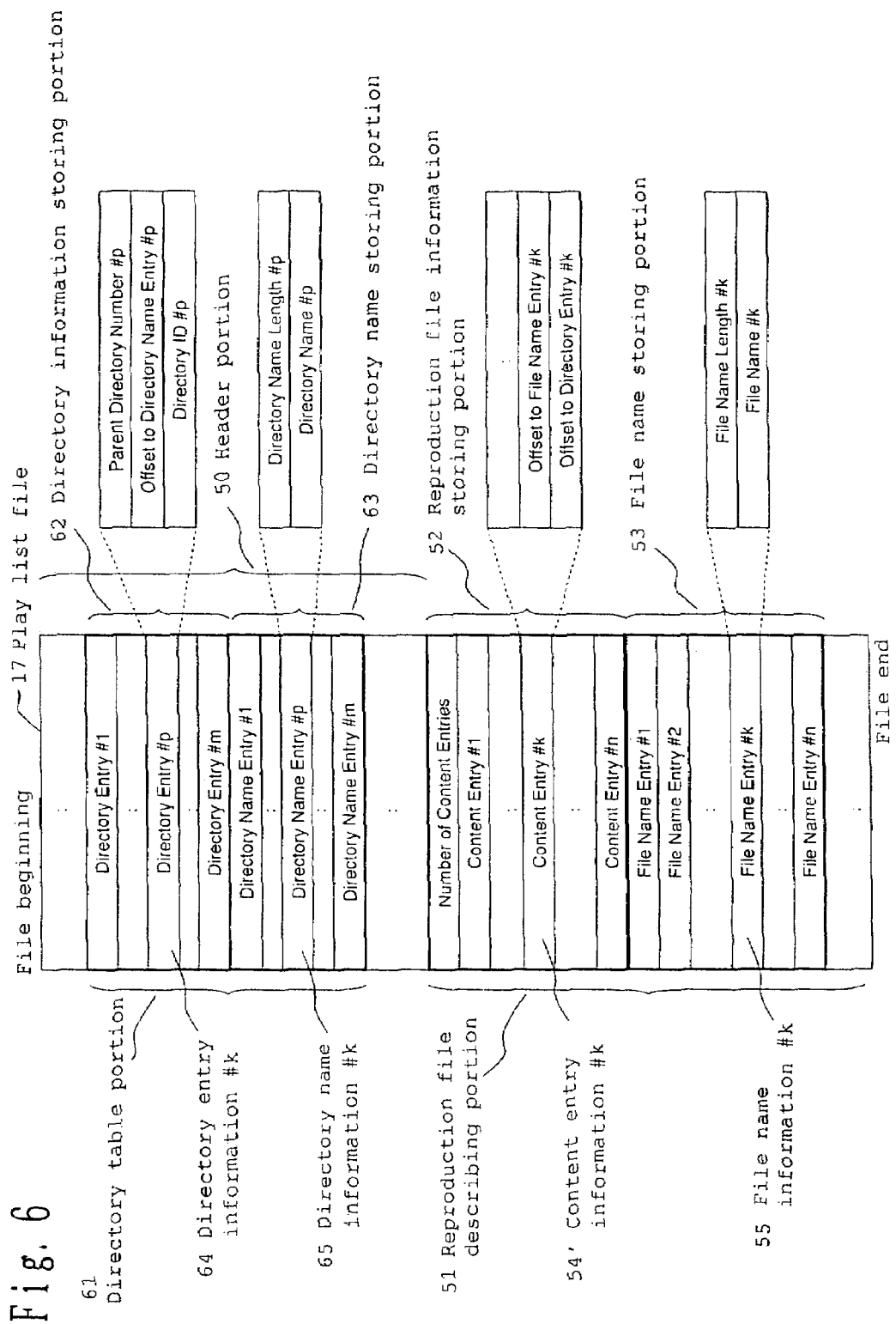
FIG. 6 is an explanatory diagram of the data storage format of the play list file 17 according to an embodiment of the present invention.

For instance, the play list file of the present invention may have a directory table portion 61 in a header portion 50 as shown in FIG. 6 which is an explanatory diagram of the data storage format of the play list file according to an embodiment of the present invention.

Figure 2:
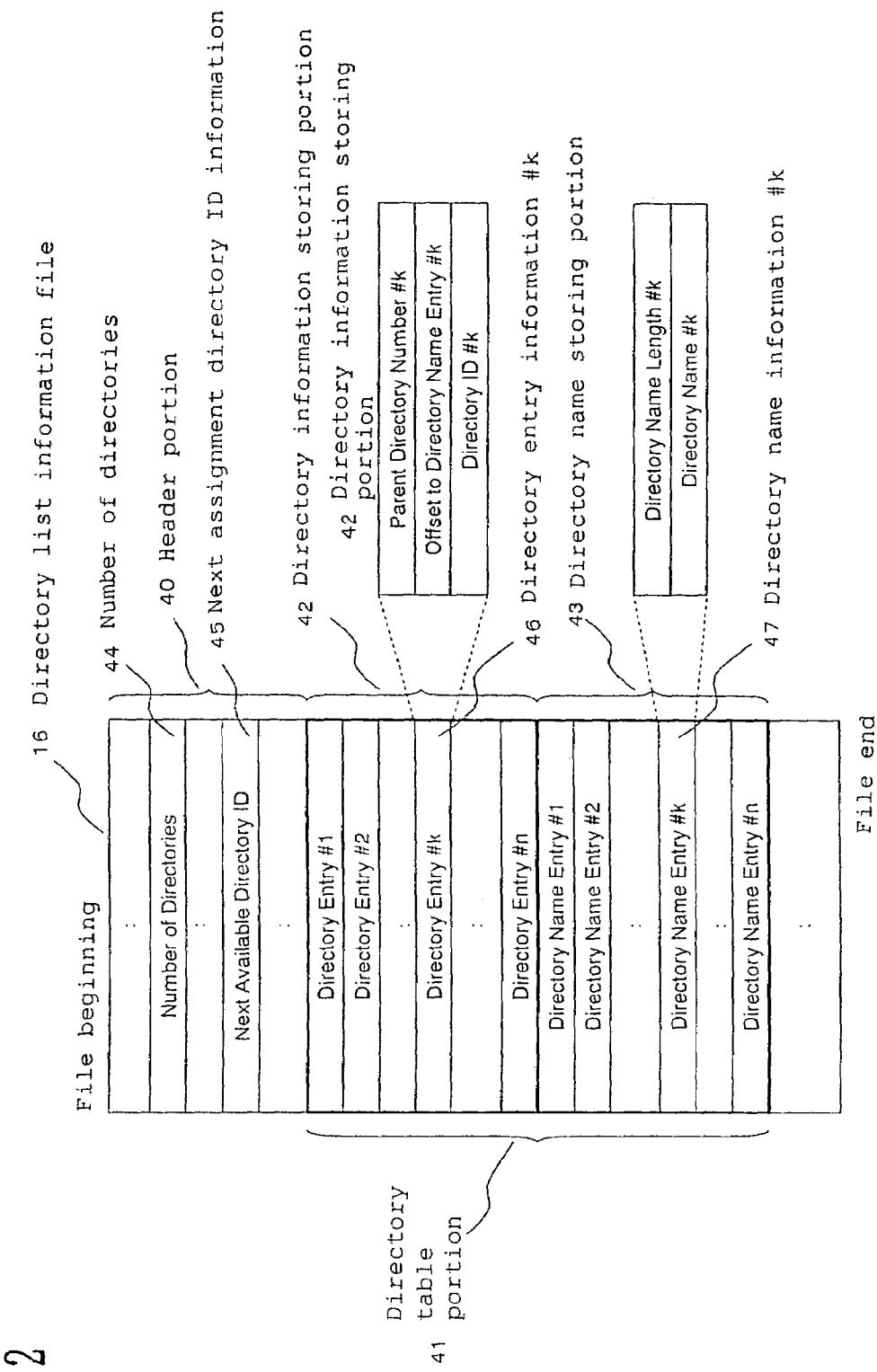
FIG. 2 is an explanatory diagram of a data storage format of a directory list information file 16 according to the first embodiment of the present invention.

To describe it more concretely, of the directory information stored in the directory table portion 41 shown in FIG. 2, only the directory related to the data file stored in the reproduction file describing portion 51 of the play list file 17 is extracted to duplicately create the directory table portion 61. The same directory is given the same directory ID as that assigned in the directory list information file 16.

Hereafter, a detailed description will be given as to the information stored in the directory table portion 61 of the play list file 17 shown in FIG. 6 in the case where, in the data structure shown in FIG. 4(*a*), the "file111" and "file22" are selected and stored in the play list file 17 as in FIG. 4(*c*). It is assumed that the information is stored in the directory table portion 41 of the directory list information file 16 as described in FIG. 4(*b*).

Figure 7:
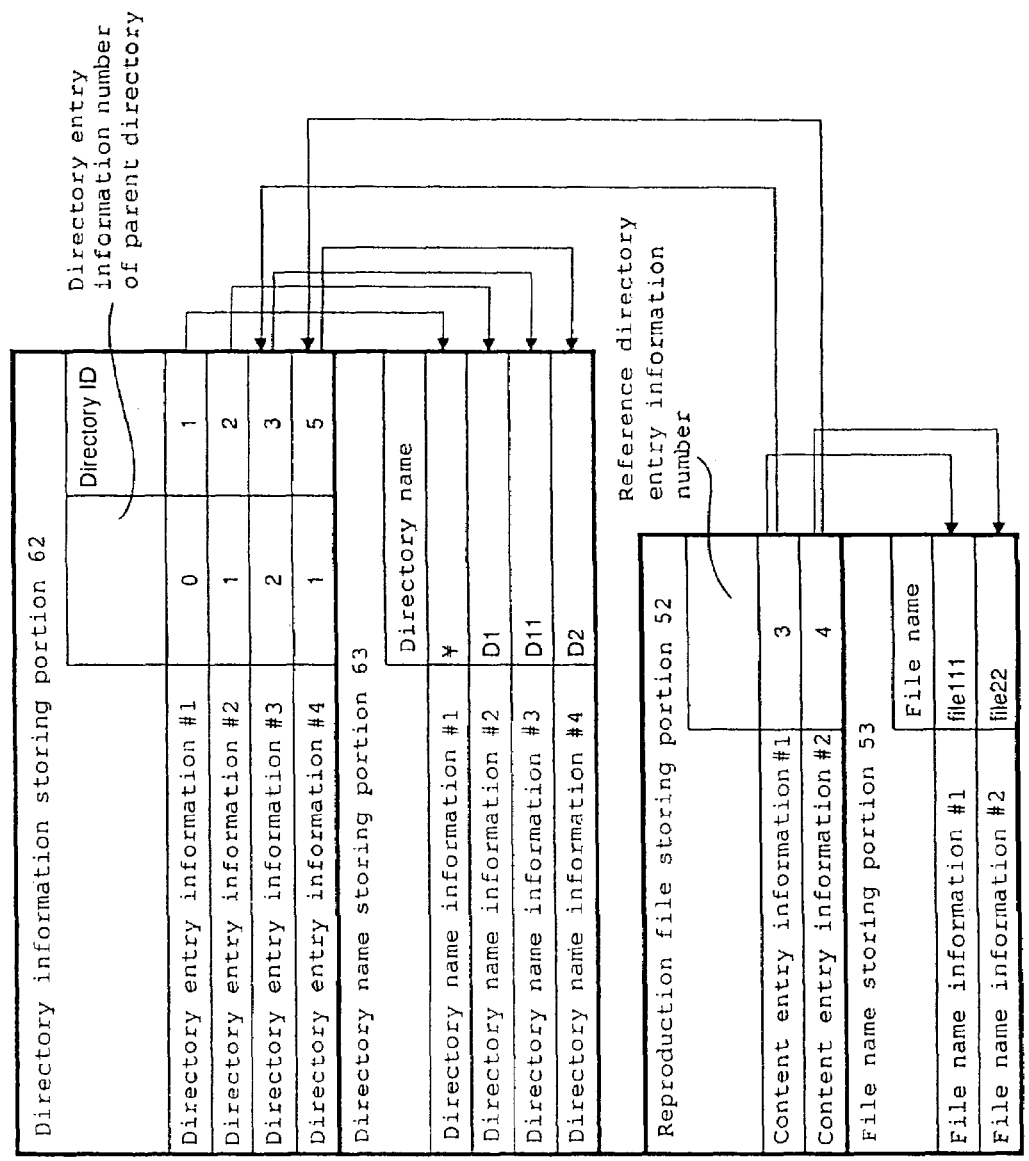
FIG. 7 is an explanatory diagram of an example of data storage of a directory table portion of the play list file 17 according to an embodiment of the present invention.

FIG. 7 is the result of storing the information in the directory table portion 61 of the play list file 17 in FIG. 6. The two data files stored in the play list file 17 are represented as "¥D1¥D11¥file111" and "¥D2¥file22" respectively if described in a form including the path names from the root directory. Therefore, the four directories of "¥," "D1," "D11," and "D2" are related to these data files. Thus, as shown in FIG. 7, the directory table portion 61 in FIG. 6 is duplicately created by extracting the directory entry information corresponding to the four of "¥," "D1," "D11," and "D2" from the information of the directory table portion 41 described in FIG. 4(*b*). In the explanatory diagram of FIG. 7, the directory "D11" to which the "file111" belongs is stored in the directory entry information #3, and the directory "D2" to which the "file22" belongs is stored in the directory entry information #4.

Figure 3:
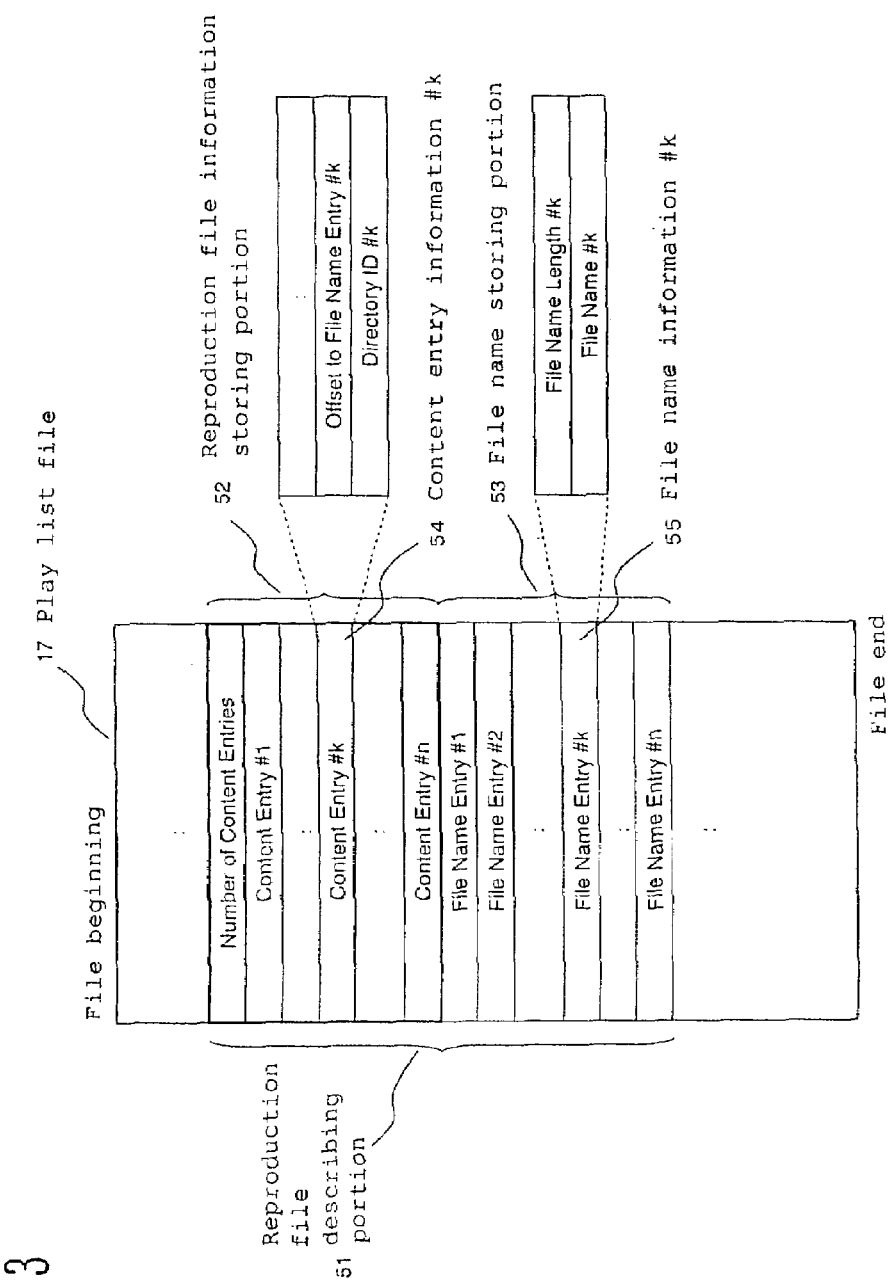
FIG. 3 is an explanatory diagram of the data storage format of a play list file 17 according to the first embodiment of the present invention.

In the play list file 17 shown in FIG. 6, the information stored in the file name storing portion 53 is the same as that in FIG. 3.

The information stored in the reproduction file information storing portion 52 is the same as that in FIG. 3 except that the reference information to the directory entry information stored in the directory table portion 61 is stored instead of the directory ID.

The reproduction file information storing portion 52 has the value 2 as the information indicating the number of the selected reproduction data files and the content entry information #1 and #2 stored therein.

The content entry information #1 has the reference information to the file name information #1 of the file name storing portion 53 and the reference information to the directory entry information #3 corresponding to the directory "D11" to which the data file belongs stored therein. The content entry information #2 has the reference information to the file name information #2 of the file name storing portion 53 and the reference information to the directory entry information #4 corresponding to the directory "D2" to which the data file belongs stored therein.

The configuration of the play list file 17 shown in FIG. 6 was described in detail above.

The operation of the reproducing apparatus 20 of reproducing the play list file 17 shown in FIG. 6 will be described. It is different from the operation of the reproducing apparatus 20 described in the first embodiment only in the operation of the controlling means 21. To be more specific, the controlling means 21 obtains the directory ID from the directory table portion 61 instead of obtaining the directory ID information from the content entry information. The other operation is the same as that described in the first embodiment.

Therefore, it goes without saying that, even in the case of the configuration of the play list file shown in FIG. 6, it is possible, by using the directory ID, to have a beneficial effect of implementing play list reproduction of good responsiveness on a device of which file system performance is not high.

Furthermore, as the play list file 17 has the configuration shown in FIG. 6, it is possible, just by reading the play list file 17, to obtain the file name of the reproduction file including the path name. Consequently, it is possible, on the reproducing apparatus using no directory ID, to reproduce the play list just by reading the play list file without reading the directory list information file.

For instance, a reproducing apparatus, such as a personal computer, having high file system performance and capability of accessing a desired data file at high speed, can perform the reproduction by using the full path name of the data file without using the directory ID, so that the play list reproduction can be started just by reading the play list file 17.

(8) The data file of the present invention is the data file of the data file group 13 stored in the internal storage means 12 according to the above-mentioned embodiment.

However, it is not limited thereto but the data file of the present invention may be the data file of the data file group recorded on the DVD-RAM medium 15.

It is possible, with the recording apparatus of the present invention, to append the directory list information file of the present invention to the DVD-RAM medium having the data file recorded thereon by the recording apparatus of the past. And the DVD-RAM medium to which the directory list information file is thus appended can be reproduced by the reproducing apparatus of the present invention by using the directory list information file. Therefore, it is possible to effectively exploit assets of the recording medium created so far.

The program of the present invention is that of causing the computer to execute the functions of all or a part of the means (or apparatuses, elements and so on) of the recording and reproducing system, the recording apparatus and the reproducing apparatus of the above-mentioned present invention, which is the program to operate in collaboration with the computer.

And the program of the present invention is that of causing the computer to execute the operations of all or a part of the steps (or processes, operations, actions and so on) of the recording and reproducing method, the recording method and the reproducing method of the above-mentioned present invention, which is the program to operate in collaboration with the computer.

The recording medium of the present invention is that of supporting the program of causing the computer to execute all or a part of the functions of all or a part of the means (or apparatuses, elements and so on) of the recording and reproducing system, the recording apparatus and the reproducing apparatus of the above-mentioned present invention, wherein the program is readable by the computer and the read program executes the functions in collaboration with the computer.

And the recording medium of the present invention is that of supporting the program of causing the computer to execute all or a part of the operations of all or a part of the steps (or processes, operations, actions and so on) of the recording and reproducing method, the recording method and the reproducing method of the above-mentioned present invention, wherein the program is readable by the computer and the read program executes the operations in collaboration with the computer.

And the recording medium of the present invention is that of supporting the data structure used in collaboration with the computer in all or a part of the means (or apparatuses, elements and so on) and steps (or processes, operations, actions and so on) of the recording and reproducing system, the recording apparatus, the reproducing apparatus, the recording and reproducing method, the recording method and the reproducing method of the above-mentioned present invention, wherein the program is readable by the computer and the read data structure is used in collaboration with the computer.

The "part of the means (or apparatuses, elements and so on)" of the present invention means one or a few of the plurality of means, and the "part of the steps (or processes, operations, actions and so on)" of the present invention means one or a few of the plurality of steps.

The "functions of the means (or apparatuses, elements and so on)" of the present invention means all or a part of the functions of the means, and the "operations of the steps (or processes, operations, actions and so on)" of the present invention means all or a part of the operations of the steps.

A form of using the program of the present invention may be a form in which it is recorded on the recording medium readable by the computer and operates in collaboration with the computer.

Another form of using the program of the present invention may be a form in which it is transmitted in a transmission medium, is read by the computer and operates in collaboration with the computer.

The data structure of the present invention includes a database, a data format, a data table, a data list, a data type and so on.

The recording medium includes an ROM and so on, and the transmission medium includes the transmission medium such as the Internet, and light, a radio wave, a sound wave and so on.

The above-mentioned computer of the present invention is not limited to sheer hardware such as a CPU, but may include firmware, an OS and also peripherals.

As described above, the configuration of the present invention may be implemented either software-wise or hardware-wise.

As is clear from the above description, the present invention is advantageous in that the play list reproduction function of good responsiveness in which reproduction wait time is curbed in the play list reproduction with the reproduction order specified by using the file name can be implemented even on a commercial-off-the-shelf device such as a DVD player having data readout speed from the recording medium which is not high compared to the personal computer and data analysis performance of the file system which is not high.

What is claimed is:

1. A recording and reproducing system comprising:
   a recording medium having a plurality of data files of storing predetermined data, on which a directory where the data files are stored is created, a directory ID to be used instead of a pathname being assigned in advance to the directory;
   play list recording means of recording a play list of specifying order of reproducing the predetermined data stored in each of all or a part of the plurality of data files by using the directory ID, in a play list file for storing the play list and held by the recording medium;
   directory list information file recording means of recording a directory table showing a correspondence between the directory ID and a directory name of the directory, in a directory list information file held by the recording medium for storing the directory table; and
   data reproducing means of reproducing the predetermined data by using the order specified by the recorded play list,
   wherein management of the play list is performed by using a file name of a data file and the directory ID of the directory to which the data file belongs, and
   wherein all or a part of the directory table is stored in the play list file.

2. The recording and reproducing system according to claim 1, wherein the directory ID to be assigned to the directory created on the recording medium next is stored in the directory list information file in advance.

3. A recording apparatus comprising:
   play list recording means of recording a play list of specifying order of reproducing predetermined data stored in each of all or a part of a plurality of data files held by a recording medium, on which a directory where the data files are stored is created, a directory ID to be used instead of a pathname being assigned in advance to the directory, by, using the directory ID in a play list file for storing the play list and held by the recording medium; and
   directory list information file recording means of recording a directory table showing a correspondence between the directory ID and a directory name of the directory, in a directory list information file held by the recording medium for storing the directory table,
   wherein the predetermined data is reproduced by using the order specified by the recorded play list,
   wherein management of the play list is performed by using a file name of a data file and the directory ID of the directory to which the data file belongs, and
   wherein all or a part of the directory table is stored in the play list file.

4. A reproducing apparatus comprising:
   data reproducing means of reproducing predetermined data stored in each of a plurality of data files held by a recording medium, on which a directory where the data files are stored is created, a directory ID to be used instead of a pathname being assigned in advance to the directory. by using order specified by a play list of specifying the order of reproducing the predetermined data stored in each of all or a part of the plurality of data files by using the directory ID,
   wherein the play list is recorded in a play list file for storing the play list and held by the recording medium,
   a directory table showing a correspondence between the directory ID and a directory name of the directory is recorded in a directory list information file held by the recording medium for storing the directory table, wherein management of the play list is performed by using a file name of a data file and the directory ID of the directory to which the data file belongs, and wherein all or a part of the directory table is stored in the play list file.

5. A recording medium having: a plurality of data files of storing predetermined data; a play list file for storing a play list of specifying order of reproducing the predetermined data stored in each of all or a part of the plurality of data files by using a directory ID, which is to be used instead of a pathname, assigned in advance to a directory where the data files are stored created on the recording medium; and a directory list information file for storing a directory table showing a correspondence between the directory ID and a directory name of the directory, wherein the play list is recorded in the play list file held by the recording medium, the directory table is recorded in the directory list information file, the predetermined data is reproduced by using the order specified by the recorded play list, wherein management of the play list is performed by using a file name of a data file and the directory ID of the directory to which the data file belongs, and wherein all or a part of the directory table is stored in the play list file.

6. A recording and reproducing method comprising:

a play list recording step of recording a play list of specifying order of reproducing predetermined data stored in each of all or a part of a plurality of data files held by a recording medium, on which a directory where the data files are stored is created, a directory ID to be used instead of a pathname being assigned in advance to the directory, by using the directory ID, in a play list file for storing the play list and held by the recording medium;

a directory list information file recording step of recording a directory table showing a correspondence between the directory ID and a directory name of the directory, in a directory list information file held by the recording medium for storing the directory table; and a data reproducing step of reproducing the predetermined data by using the order specified by the recorded play list, wherein management of the play list is performed by using a file name of a data file and the directory ID of the directory to which the data file belongs, and wherein all or a part of the directory table is stored in the play list file.

7. A recording method comprising:

a play list recording step of recording a play list of specifying order of reproducing predetermined data stored in each of all or a part of a plurality of data files held by a recording medium, on which a directory where the data files are stored is created, a directory ID to be used instead of a pathname being assigned in advance to the directory, by using the directory ID, in a play list file for storing the play list and held by the recording medium; and a directory list information file recording step of recording a directory table showing a correspondence between the directory ID and a directory name of the directory, in a directory list information file held by the recording medium for storing the directory table, wherein the predetermined data is reproduced by using the order specified by the recorded play list, wherein management of the play list is performed by using a file name of a data file and the directory ID of the directory to which the data file belongs, and wherein all or a part of the directory table is stored in the play list file.

8. A reproducing method comprising:

a data reproducing step of reproducing predetermined data stored in each of a plurality of data files held by a recording medium, on which a directory where the data files are stored is created, a directory ID to be used instead of a pathname being assigned in advance to the directory, by using order specified by a play list of specifying the order of reproducing the predetermined data stored in each of all or a part of the plurality of data files by using the directory ID, wherein the play list is recorded in a play list file for storing the play list and held by the recording medium, a directory table showing a correspondence between the directory ID and a directory name of the directory is recorded in a directory list information file held by the recording medium for storing the directory table, wherein management of the play list is performed by using a file name of a data file and the directory ID of the directory to which the data file belongs, and wherein all or a part of the directory table is stored in the play list file.

9. A computer-readable recording medium of recording a program, which program causes a computer to act as the play list recording step of recording a play list of specifying order of reproducing predetermined data stored in each of all or a part of a plurality of data files held by a recording medium, on which a directory where the data files are stored is created, a directory ID to be used instead of a pathname being assigned in advance to the directory, by using the directory ID, in a play list file for storing the play list and held by the recording medium, to act as the directory list information file recording step of recoding a directory table showing a correspondence between the directory ID and a directory name of the directory, in a directory list information file held by the recording medium for storing the directory table, and to act as the data reproducing step of reproducing the predetermined data by using the order specified by the recorded play list, in the recording and reproducing method according to claim 6.

10. A computer-readable recording medium of recording a program, which program causes a computer to act as the play list recording step of recording a play list of specifying order of reproducing predetermined data stored in each of all or part of a plurality of data files held by a recording medium, on which a directory where the data files are stored is created, a directory ID to be used instead of a pathname being assigned in advance to the directory. by using the directory ID, in a play list file for storing the play list and held by the recording medium, and to act as the directory list information file recording step of recording a directory table showing a correspondence between the directory ID and a directory name of the directory, in a directory list information file held by the recording medium for storing the directory table, in the recording method according to claim 7.

11. A computer-readable recording medium of recording a program, which program causes a computer to act as the data reproducing step of reproducing predetermined data stored in each of a plurality of data files held by a recording medium, on which a directory where the data files are stored is created, a directory ID to be used instead of a pathname being assigned in advance to the directory, by using order specified by a play list of specifying the order of reproducing the predetermined data stored in each of all or a part of the plurality of data files by using the directory ID, in the reproducing method according to claim 8.

\* \* \* \* \*

UNITED STATES PATENT AND TRADEMARK OFFICE
CERTIFICATE OF CORRECTION

PATENT NO. : 7,617,242 B2 Page 1 of 1
APPLICATION NO. : 11/090544
DATED : November 10, 2009
INVENTOR(S) : Keisuke Matsuo et al.

It is certified that error appears in the above-identified patent and that said Letters Patent is hereby corrected as shown below:

At Column 14, line 40, Claim 3, "directory, by, using the directory ID in a play list file for" should read --directory, by using the directory ID, in a play list file for--

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,617,242 B2 | Page 1 of 1 |
| APPLICATION NO. | : 11/090544 | |
| DATED | : November 10, 2009 | |
| INVENTOR(S) | : Keisuke Matsuo et al. | |

It is certified that error appears in the above-identified patent and that said Letters Patent is hereby corrected as shown below:

Add on the Title Page, Item [73], should read: Assignees: --Microsoft Corporation, Redmond, WA (US)--

Signed and Sealed this
Twenty-seventh Day of September, 2011

David J. Kappos
*Director of the United States Patent and Trademark Office*